April 25, 1961
S. R. BLACK
2,980,992
BALANCING APPARATUS
Filed July 7, 1958
4 Sheets-Sheet 1
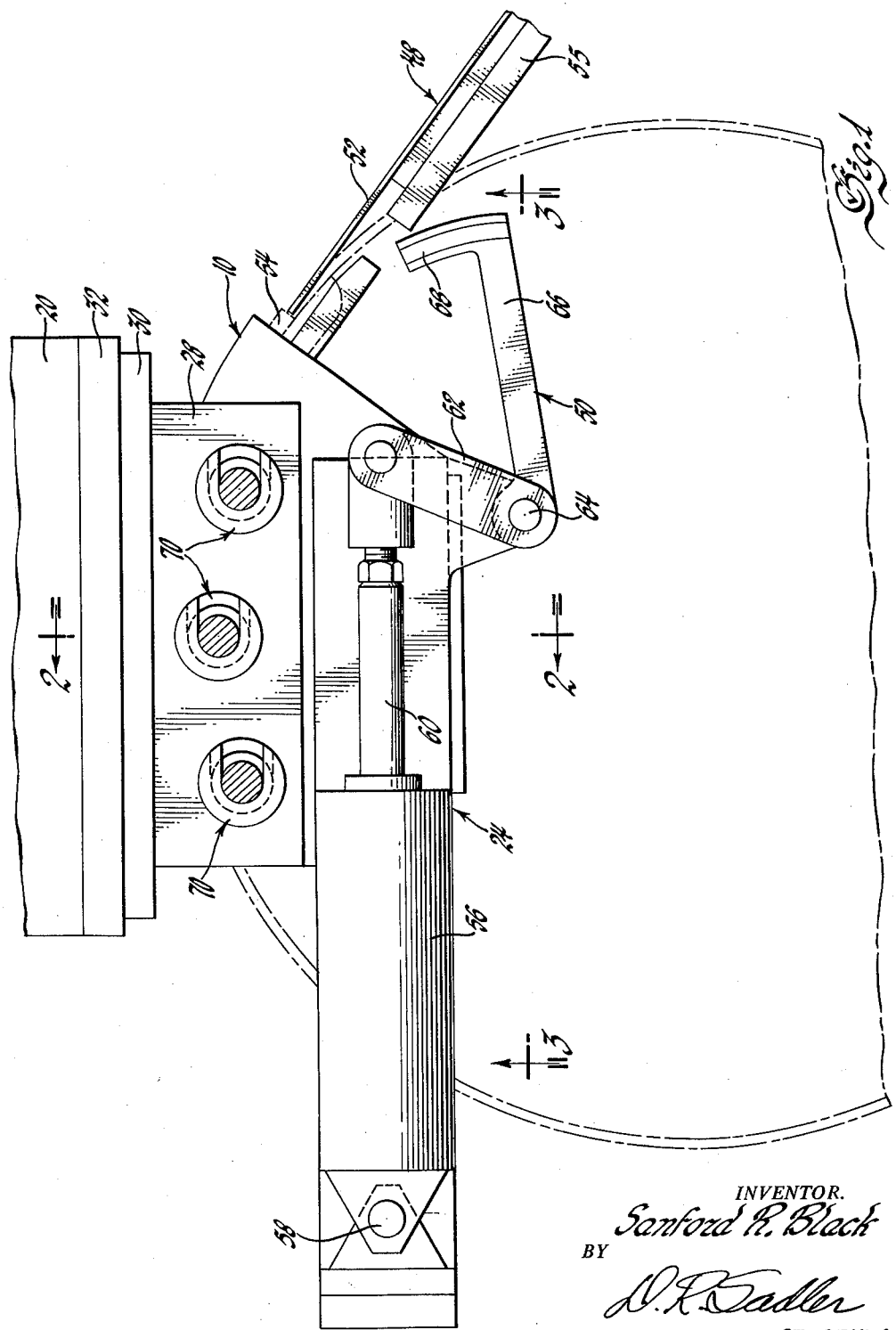
INVENTOR.
Sanford R. Black
BY
D. R. Sadler
ATTORNEY

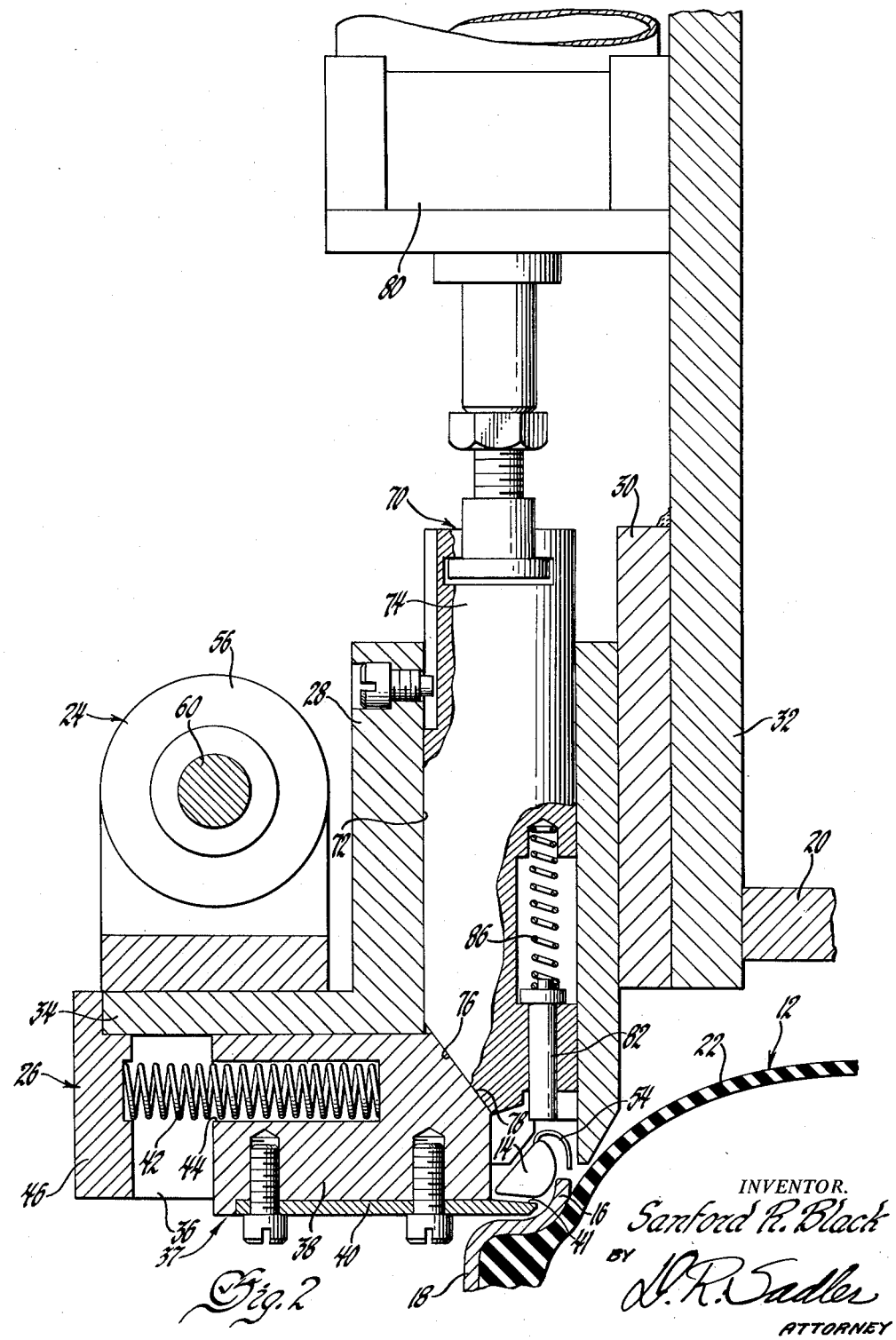

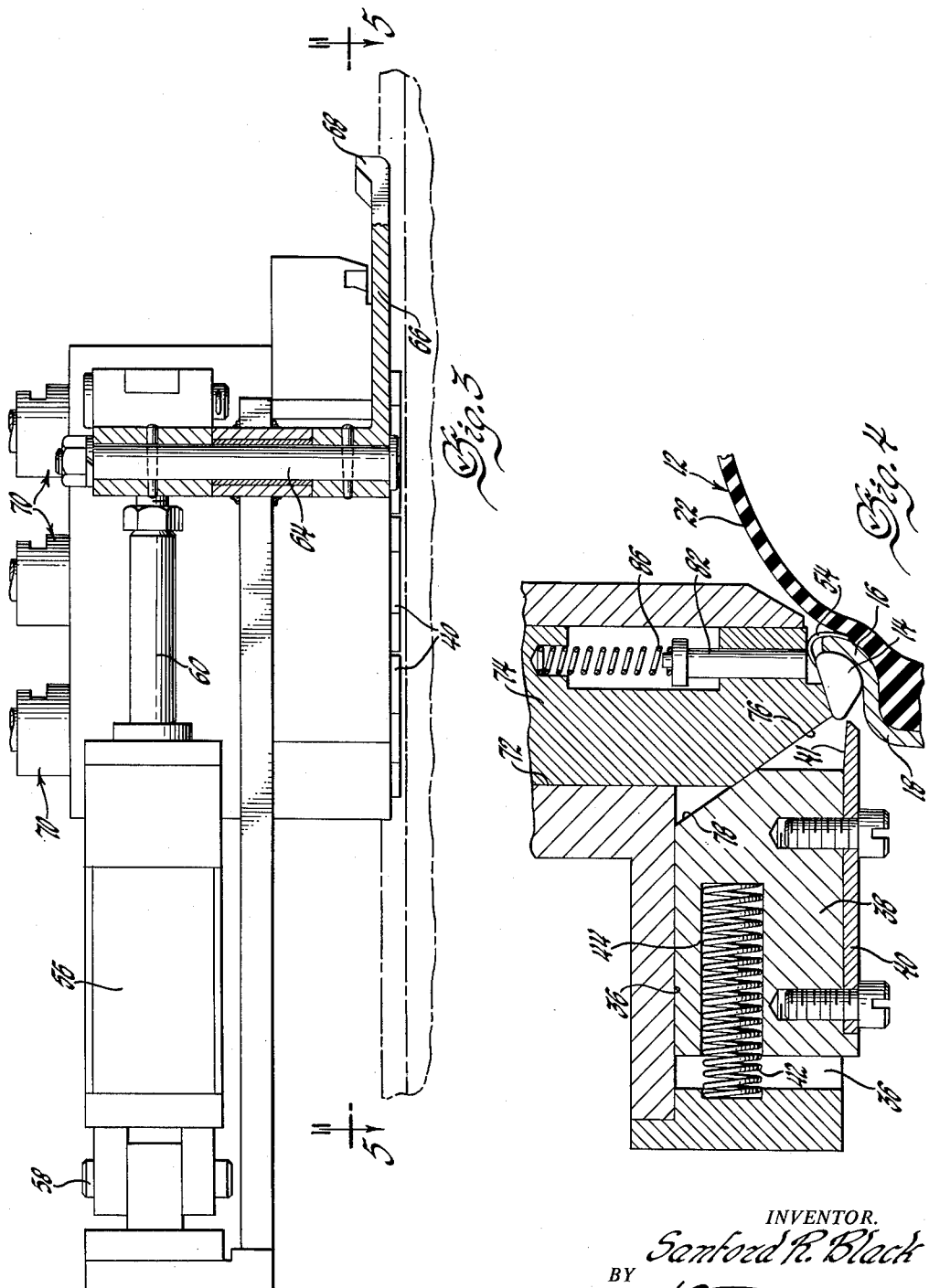

April 25, 1961    S. R. BLACK    2,980,992
BALANCING APPARATUS
Filed July 7, 1958    4 Sheets-Sheet 4

INVENTOR.
Sanford R. Black
BY
D. R. Sadler
ATTORNEY

2,980,992
BALANCING APPARATUS

Sanford R. Black, Detroit, Mich., assignor to General Motors Corporation, Detroit, Mich., a corporation of Delaware Filed July 7, 1958, Ser. No. 746,847

5 Claims. (Cl. 29—208)

The present invention relates to balancing apparatus and more particularly to means for automatically applying counterbalance weights to a workpiece.

At the present time when mass producing workpieces, it is highly desirable to employ means for measuring the amount and location of unbalance in the workpieces being produced and to automatically perform a correction operation on the workpiece so as to reduce the unbalance to within acceptable limits. Normally, these correction operations are accomplished by removing material from the heavy side by drilling, grinding, etc. or by adding material to the light side by welding, etc. Such operations provide a permanent correction of the unbalance. However, in certain instances, for example the road wheels on the automotive vehicle, the weight distribution is subject to frequent changes from rapid and/or uneven wearing or even disassembling and reassembling the workpiece to make necessary repairs. Any one or more of these factors will adversely effect the mass distribution and as a result require rebalancing. Accordingly, when balancing workpieces of this nature, it is highly desirable for at least a portion of the original balance weights to be movable so as to facilitate subsequent rebalancing thereof. Heretofore, there have not been any acceptable apparatus for use on an assembly line which will reliably select and apply suitable quantities of removable balance weights, particularly, arcuately shaped weights such as required for use on wheel assemblies. Accordingly, it has been customary in production line operations to select a weight in accordance with the unbalance determination and manually attach the weight to the wheels. This is a time consuming operation in which the accuracy is dependent upon the human element.

It is now proposed to provide means for automatically attaching various predetermined combinations of balance weights to a workpiece such as an automotive wheel in response to an unbalance signal so as to reduce the amount of unbalance to within acceptable limits. More particularly, this is to be accomplished by providing a balance correction apparatus having a correction station and means for positioning the wheel with the lightest portion thereof under the station. The correction station includes a plurality of balance weight holders for positioning the weights adjacent the rim of the wheel and a feed mechanism for supplying individual balance weights to each of the weight holders. All of the weights are of identical mass and are provided with a suitable spring clip for retaining the weights on the wheel rim. A separate drive is provided for each of the holders for forcing the weight out of its holder and against the wheel rim for causing the spring clip on the weight to become attached to the rim. Since the weights are all substantially identical the amount of correction applied will be in finite increments. However, by actuating the drives in various combinations in response to an unbalance signal representing the unbalance in the wheel, preselected combinations of balance weights will be applied to the wheel so as to thereby reduce the unbalance of the tire and wheel assembly to within acceptable limits.

In the four sheets of drawings:

Figure 1 is a fragmentary plan view of a balancing apparatus embodying the present invention.

Figure 2 is a fragmentary vertical cross-sectional view taken substantially along the plane of line 2—2 in Figure 1.

Figure 3 is a fragmentary vertical cross-sectional view taken substantially along the plane of line 3—3 in Figure 1.

Figure 4 is an enlargement of a portion of Figure 2 showing the apparatus in a different operating position.

Figure 5:
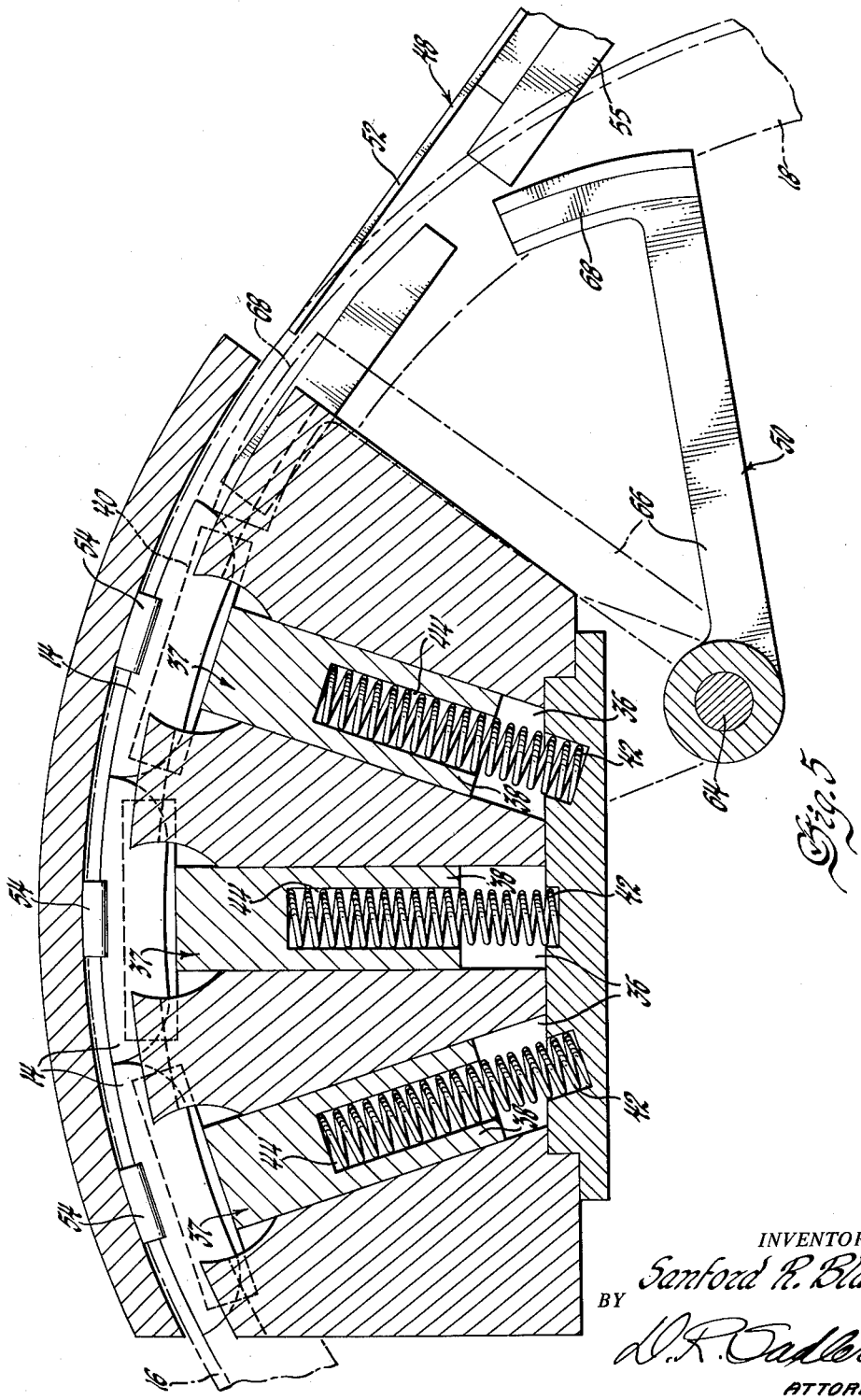
Figure 5 is a cross-sectional view, on an enlarged scale, taken substantially along the plane of line 5—5 in Figure 3.

Referring to the drawings in more detail, the present invention is embodied in a balancing apparatus 10 particularly adapted for use in balancing automotive wheel and tire assemblies 12 by applying counterbalance weights 14 to the rims 16 of the wheels 18.

The balancing apparatus 10 includes a base having a vertical pedestal projecting upwardly therefrom for supporting a wheel and tire assembly 12 in a substantially horizontal plane. In addition, a bracket 20 projects upwardly from the base with a portion thereof extending over the tire 22 to support a correction station 24 adjacent the wheel rim 16 for applying the balance weights 14 thereto.

The correction station 24 includes a carrier member 26 having a vertical portion 28 secured to support 30 welded or otherwise secured to a backing plate 32 on the end of the bracket 20. The carrier 26 also includes a substantially horizontal portion 34 which is disposed over the rim 16 and projects radially inwardly towards the center of the wheel 18. A plurality of radial passages 36 extend horizontally through the horizontal portion 34 of the carrier 26 and terminate at circumferentially spaced points immediately above the rim 16. Each of these passages 36 slidably supports a balance weight holder 37 adapted to retain the balance weights in position adjacent the wheel rim. Each holder 37 comprises a block 38 that slides axially of the passage 36 for reciprocating movement toward and away from the wheel rim 16. The bottom of the block 38 has a plate 40 secured thereto so as to project past the end of the block 38 and form a shelf 41 suitable for supporting the balance weights 14 thereon. A coil spring 42 is provided in a passage 44 drilled axially into the end of the block 38 whereby the end thereof will seat in a socket in a backing plate 46. Thus it may be seen that each of the shelves 41 will be biased radially outwardly so as to position balance weights 14 immediately adjacent the wheel rim 16.

The individual balance weights 14 are supplied to the various holders 37 by means of a feed mechanism that includes a chute 48 containing a series of balance weights 14 and a transfer mechanism 50 for moving the weights 14 from the chute 48 onto the balance weight holders 37. The chute 48 comprises a rail 52 that terminates adjacent the weight holders 37 and is adapted to allow the spring clips 54 on the weights 14 to fit loosely thereover and slide therealong. A backing channel 55 may be provided to enclose and protect the weights 14 on the rail 52. The transfer mechanism 50 comprises an air cylinder 56 that has one end thereof pivotally secured to a pin 58 for allowing the cylinder 56 to pivot about the axis thereof. A piston rod 60 projects from the opposite end of the cylinder 56 and is attached to an arm 62 on the upper end of a vertical shaft 64. A second arm 66 is secured to the lower end of the shaft 64 and includes a ram 68 on the outer end. This ram 68 is positioned to swing alongside of the rail 52 and engage any weights 14 positioned thereon. Thus whenever the air cylinder 56 is energized, the ram 68 will swing into engagement with a weight 14 and force it across the shelves 41. This operation may be repeated until all of the holders 37 are supplied with individual balance weights.

In order to secure the weights 14 onto the rim 16 of the wheel 18, a separate drive 70 is provided for each weight holder 37. Each drive 70 comprises a vertical passage 72 that extends downwardly to intersect the end of a horizontal passage 36. A plunger 74 is slidably disposed in each passage 72 so that a beveled end 76 thereon bears against a complementary beveled end 78 of the block 38. An extensible drive such as an air cylinder 80 is provided for each of the plungers 74 for forcing the plungers 74 downwardly. In addition, a pin 82 projects from the end of the plunger 74 so as to engage the spring clip 54 on any balance weight 14 therebelow. This pin 82 is preferably reciprocably mounted on the plunger 74 and spring biased outwardly.

It may thus be seen that energizing the air cylinder 80 will force the plunger 74 downwardly towards the rim 16 of the wheel 18. When this occurs the pin 82 will engage the spring clip 54 and bias the balance weight 14 toward the wheel rim 16 with the spring clip 54 passing over the side of the rim 16. In addition, the beveled surface 76 on the plunger 74 will slide across the beveled surface 78 on the end of the block 38. This will cause the block 38 and the shelf 41 secured thereto to retract radially inwardly and away from the rim 16. In the event the pin 82 engages the spring clip 54 while the weight 14 is supported on the shelf 41, the pin 82 will compress the spring 86 until such time as the plunger 74 forces the block 38 to slide sufficiently radially inwardly until the weight 14 is clear of the shelf 41. As soon as this shelf 41 is clear of the weight 14, the plunger 74 and the pin 82 will force the weight 14 against the rim 16 and the spring clip 54 over the rim. Thus the weight 14 will be locked in position on the rim 16.

In operation the amount and location of unbalance in the wheel and tire assembly 12 is determined by any suitable means but preferably at another station. The wheel and tire are then transferred onto the pedestal to be supported with the lightest portion thereof disposed under the correction station 24. The wheel 18 may be indexed into this position prior to, during, or subsequent to the transfer operation by any suitable means. The information as to the amount of unbalance is transferred to the control mechanism for actuating the air cylinders 80 and once the assembly 12 is in position the required number of air cylinders 80 are energized. This will cause the corresponding plungers 74 to descend and attach the required number of weights 14 to be secured to the rim 16.

In the event the amount of unbalance of the assembly 12 is within a range corresponding to one half to one and a half times the unbalance couple that would be produced by a single weight 14, only the center air cylinder 80 will be energized so as to apply a single weight 14 at the lightest portion of the rim 16. If the magnitude of unbalance is in a range corresponding to one and a half to two and a half times the couple that would be produced by a single weight 14, the two end air cylinders 80 will be energized. This will apply the two end balance weights 14 to the rim 16 at points located symmetrically about the light point on the rim. In the event the unbalance is in a range corresponding to two and a half to three and a half times the couple that would be produced by a single weight 14, all three of the air cylinders 80 will be energized so as to apply all three of the weights 14 to the rim 16. This will cover the amount of unbalance normally present in the tire and wheel assembly and reduce the unbalance to a couple less than one half of the amount produced by a single weight. In the event a wider range of correction and/or closer tolerances are required, the number of weights that are to be applied can be increased to any desired amount.

When the foregoing correction operation has been completed, the transfer mechanism 50 will feed weights 14 across the weight holders 37 until they are all loaded. Thus, when another unbalanced wheel and tire assembly 12 is placed in the machine, another correction operation may be performed.

What is claimed is:

1. Wheel balancing apparatus including means for supporting a wheel on a fixed axis, a plurality of radially extending weight positioners arranged circumferentially about said axis, weight holding means on the radially outward end of each positioner for supporting a balance weight, means for feeding balancing weights into said weight holding means, said weights having retaining means thereon arranged to grip the rim of said wheel, biasing means urging said positioners radially outward from said axis, a plurality of weight apply means slidably mounted for reciprocation parallel to said axis and having portions thereon arranged to contact said work positioners to move the same radially inward against said biasing means, means carried by said weight apply means arranged to contact the balancing weights supported by said weight holding means to force the retaining means on said balancing weights on the rim of a wheel supported on said apparatus, and means for individually reciprocating each of said weight apply means.

2. Wheel balancing apparatus including support means for holding a rimmed wheel on a fixed axis, a plurality of radially extending weight positioners circumferentially spaced a predetermined distance about said axis, weight holding means on the radially outward end of each positioner for supporting a balance weight having a length equal to said predetermined distance, said weights having rim gripping means thereon, means for holding a supply of balance weights located adjacent the outer end of one of said positioners, weight advancing means for transferring weights from said weight supply holding means to said one positioner, said weight transfer acting to force any weight already on said one positioner to the next adjacent positioner, biasing means urging said positioners radially outward from said axis toward the rim of a wheel on said support means, a plurality of weight apply members slidably mounted for reciprocation parallel to said axis and each having portions thereon arranged to contact one of said work positioners to move the same radially inward against said biasing means away from said wheel rim, means carried by said weight apply members adapted to contact the balancing weight on said positioning means to force the rim gripping means on the rim of a wheel supported on said apparatus, and means for independently moving said weight apply members to effect movement of said positioners away from said rim and simultaneously effect attachment of the balancing weights to the wheel rim.

3. In an apparatus for applying a corrective balance weight having rim gripping means thereon to a circular workpiece having a rim, the combination comprising, a positioning holder adapted to receive a workpiece, yieldable means for moving said holder into position wherein said rim gripping means on balance weight is immediately adjacent the rim of said workpiece, a drive member movable to contact and force the rim gripping means on said balance weight into the rim of said workpiece for attachment of the weight thereto, said drive member having cam means thereon arranged to contact said holder and move the same away from said workpiece during attachment of said balancing weight, and means operatively connected to said drive member for moving the same to effect attachment of said weight to said rim and to effect movement of said holder away from said workpiece.

4. The apparatus of claim 3 wherein said drive member carries a movable element arranged to engage the gripping means on said balance weight, resilient means carried by said drive member and adapted to urge said movable element into arrangement with said gripping means.

5. The apparatus of claim 3 wherein said holder includes a weight supporting member, said weight supporting member located between said weight and the workpiece rim when said weight is positioned adjacent the rim of said workpiece, and yieldable means carried by said drive member arranged to urge the gripping means on said balance weight toward the workpiece rim, said cam means operating to move said work supporting member away from its location between said weight and the workpiece rim whereby said yieldable means will act to force the gripping means on said weight onto the rim of said workpiece.

References Cited in the file of this patent

UNITED STATES PATENTS

| | | |
|---|---|---|
| 1,319,928 | Kennedy | Oct. 28, 1919 |
| 2,219,795 | Degrift | Oct. 29, 1940 |
| 2,432,659 | Criswell | Dec. 16, 1947 |
| 2,680,974 | Hunter | June 15, 1954 |
| 2,780,939 | Kellogg | Feb. 12, 1957 |
| 2,792,625 | Hoffman | May 21, 1957 |
| 2,814,858 | Erdmann | Dec. 3, 1957 |
| 2,821,858 | King | Feb. 4, 1958 |